(12) United States Patent
Van Rensburg

(10) Patent No.: US 10,491,683 B2
(45) Date of Patent: Nov. 26, 2019

(54) COMMUNICATION MANAGEMENT METHOD AND SYSTEM FOR INSERTING A BOOKMARK IN A CHAT SESSION

(71) Applicant: RingCentral, Inc., Belmont, CA (US)

(72) Inventor: Christopher Van Rensburg, Foster, CA (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 16/002,951

(22) Filed: Jun. 7, 2018

(65) Prior Publication Data

US 2019/0007499 A1 Jan. 3, 2019

Related U.S. Application Data

(63) Continuation of application No. 15/640,084, filed on Jun. 30, 2017, now Pat. No. 10,021,190.

(51) Int. Cl.
*H04L 29/08* (2006.01)
*G06F 3/0482* (2013.01)
(Continued)

(52) U.S. Cl.
CPC ............ *H04L 67/14* (2013.01); *G06F 3/0482* (2013.01); *G06F 16/9562* (2019.01);
(Continued)

(58) Field of Classification Search
CPC ....... H04L 67/14; H04L 41/22; H04L 43/045; H04L 43/08; G06F 17/241; B42D 9/001
See application file for complete search history.

(56) References Cited

U.S. PATENT DOCUMENTS 6,938,069 B1 * 8/2005 Narayanaswamy ... G06Q 10/10
345/2.2
9,286,407 B2 * 3/2016 Curwen .............. G06F 16/9562
(Continued)

FOREIGN PATENT DOCUMENTS

WO WO-2016093609 A1 6/2016

OTHER PUBLICATIONS

Webpage discussion titled "Is it possible to bookmark a conversation in chat, which has messages in two different ways?," https://meta.stackexchange.com/questions/160767/is-it-possible-to-bookmark-a-conversation-in-chat-which-has-messages-in-two-dif, last visited on Jul. 5, 2017.

(Continued)

*Primary Examiner* — Mohamed A. Wasel
(74) *Attorney, Agent, or Firm* — Finnegan, Henderson, Farabow, Garrett & Dunner, LLP

(57) ABSTRACT

Communication management methods and systems may insert a bookmark in a chat session. In one implementation, a communication management server is provided. The communication management server comprises a memory storing a set of instructions, and at least one processor configured to: receive, from a plurality of user devices, communication messages associated with a group communication session; store the communication messages in a communication content database; provide the communication messages for display on a display of a user device; receive a display suspension instruction; and generate a visit bookmark indicating a last displayed message in the communication messages.

20 Claims, 9 Drawing Sheets

(51) Int. Cl.
    *G06F 16/955*     (2019.01)
    *G06Q 50/00*     (2012.01)
    *G06Q 10/10*     (2012.01)
    *G06F 3/0488*     (2013.01)
    *G06F 3/0483*     (2013.01)

(52) U.S. Cl.
    CPC ........... *G06Q 10/103* (2013.01); *G06Q 50/01* (2013.01); *H04L 67/10* (2013.01); *H04L 67/22* (2013.01); *G06F 3/0483* (2013.01); *G06F 3/0488* (2013.01)

(56) References Cited

U.S. PATENT DOCUMENTS

| | | | |
|---|---|---|---|
| 2001/0011266 A1 | 8/2001 | Baba | |
| 2006/0171515 A1 | 8/2006 | Hintermeister et al. | |
| 2007/0244903 A1 | 10/2007 | Ratliff et al. | |
| 2009/0006304 A1* | 1/2009 | Ma | G06F 16/9562 706/52 |
| 2010/0169756 A1* | 7/2010 | Bonchi | G06F 16/9562 715/206 |
| 2011/0320976 A1* | 12/2011 | Piersol | G06F 3/0483 715/810 |
| 2012/0105458 A1* | 5/2012 | Audet | G06F 17/2205 345/473 |
| 2012/0150863 A1* | 6/2012 | Fish | G06Q 10/101 707/741 |
| 2012/0176543 A1* | 7/2012 | Jeong | G06F 3/0482 348/563 |
| 2013/0198296 A1* | 8/2013 | Roy | H04L 51/16 709/206 |
| 2013/0325603 A1* | 12/2013 | Shamir | G06Q 30/0251 705/14.52 |
| 2014/0297634 A1* | 10/2014 | Brooks | G06Q 50/01 707/733 |
| 2014/0310365 A1* | 10/2014 | Sample | H04L 51/16 709/206 |
| 2016/0073056 A1* | 3/2016 | Katzman | H04N 7/15 348/14.07 |
| 2017/0195271 A1* | 7/2017 | Abraham | H04L 65/1093 |

OTHER PUBLICATIONS

Webpage discussion titled "Bookmark button," https://www.mumsnet.com/Talk/site_stuff/a1966142-Bookmark-button, last visited on Jul. 5, 2017.

\* cited by examiner

COMMUNICATION MANAGEMENT METHOD AND SYSTEM FOR INSERTING A BOOKMARK IN A CHAT SESSION

CROSS REFERENCE TO RELATED APPLICATION(S)

This is a continuation of application Ser. No. 15/640,084, filed Jun. 30, 2017, the entire content of which is incorporated herein by reference.

TECHNICAL FIELD

The present disclosure relates to the field of communication management and, more particularly, communication management methods and systems for session visit auto-bookmarking.

BACKGROUND

In a group communication environment, such as a collaboration platform, a chat application, or a social network platform, when a user is reviewing recent activities or unread messages in a current session, the user may intentionally leave the session or accidentally leave the session abruptly. For example, when the user receives a notification in another session or in another application or she may have some other urgent matters to attend to, the user may have to leave the current session before finishing her review of all unread messages.

However, once the user switches out of the current session, all of the messages not read during that session may be automatically marked as read or considered read by the application managing the session. In some applications, upon the user's return, the applications may display only the most recent unread messages to the user. The user may have difficulty remembering where she left off during her previous session visit so she can continue reviewing all unread messages, including messages from the previous visit marked as read and any new unread messages received after her previous visit. The problem may be even more acute when the user has multiple sessions in different applications or platforms operating simultaneously.

In view of these and other problems, communication management methods and systems that can effectively bookmark the user's visits and enable the user to easily navigate back to a location during her previous visits are desired.

SUMMARY

In one disclosed embodiment, a communication management server for session visit auto-bookmarking is disclosed. The communication management server comprises a memory storing a set of instructions, and at least one processor configured to execute the instructions to receive communication messages from a plurality of user devices, store the communication messages in a communication content database, provide communication content for display on the user device, receive a display suspension instruction, and generate a visit bookmark indicating a last displayed message in the communication content based on the received display suspension instruction.

In another disclosed embodiment, a communication management method for session visit auto-bookmarking is disclosed. The method comprises receiving communication messages from a plurality of user devices, storing the communication messages in a communication content database, providing communication content for display on the user device, receiving a display suspension instruction, and generating a visit bookmark indicating a last displayed message in the communication content based on the received display suspension instruction.

In another embodiment, a non-transitory computer readable medium is disclosed. The non-transitory computer readable medium stores a set of instructions, which are executable by at least one processor of a communication management apparatus to perform a communication management method for session visit auto-bookmarking. The method comprises receiving communication messages from a plurality of user devices, storing the communication messages in a communication content database, providing communication content for display on the user device, receiving a display suspension instruction, and generating a visit bookmark indicating a last displayed message in the communication content based on the received display suspension instruction.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
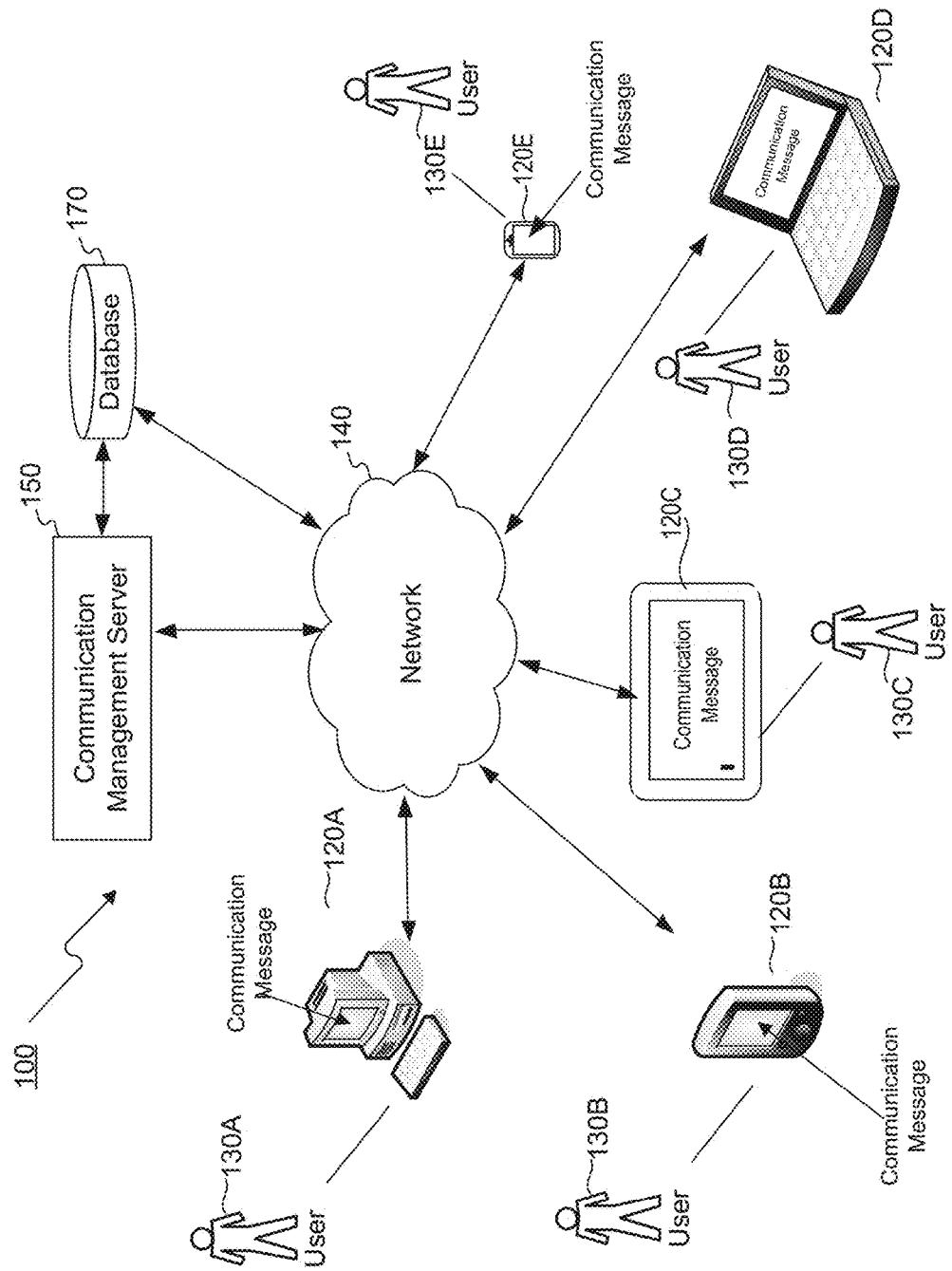
FIG. 1 is a diagram of an example communications system in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

In an electronic group communication environment, such as a collaboration platform, a chat application, or a social network platform, a user may visit a session and review recent messages posted since her last visit. The user may then leave the current session before finishing her review of all unread messages, for example, messages not yet displayed to the user. For example, the user may exit the environment to attend to an urgent matter associated with another application, or to check notifications regarding new activities in another session. When this happens, it would be useful to insert a bookmark indicating where the user interrupted her visit such that she can continue reviewing unread messages upon her return. Further, it may be desirable to provide a visit history interface providing details of the user's previous visits.

Example embodiments disclosed herein provide methods and systems for automatically bookmarking user visits in a session, for example, a communication session on an electronic platform where users participate and exchange information in various formats. A visit bookmark refers to, for example, a mark of any type reflecting a position associated with content of a communication session. For example, a visit bookmark in one embodiment may be used to mark a position on a user interface displaying content of a communication session. As further described below, the bookmark may be manifested in the form of, for example, an icon displayed on a user interface marking a certain position or a communication message in the displayed content, an option icon which is listed in an operation menu and links to a certain position on a user interface displaying content of a communication session, a marker inserted into a position associated with one or more communication messages, or a visual indication distinguishing a portion of communication content from another portion.

Consistent with some embodiments of the present disclosure, a communication management server may receive and store communication messages from a plurality of user devices. Upon receiving a display instruction from a user device to display communication content of a session, the communication management server may accordingly provide the communication content, and cause the communication content to appear on a display of the user device. The communication content may include the communication messages received from other user devices, messages from the system, and time markers or other descriptions associated with the received messages. Upon receiving a display suspension instruction from the user device, the communication management server may generate a visit bookmark indicating a position or a displayed message in the communication content before the display is suspended. Upon a subsequent display instruction from the user device, the communication management server may cause the visit bookmark to appear on the display of the user device. Selection of the bookmark may direct the user back to the position or message as indicated by the bookmark.

The embodiments herein further include computer-implemented methods, tangible non-transitory computer-readable media, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such as a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps consistent with the embodiments disclosed herein. Additionally, one or more computer-readable storage medium can be utilized in implementing a computer-implemented method. The term "computer-readable storage medium" should be understood to include tangible items and exclude carrier waves and transient signals.

FIG. 1 is a diagram of an example communications system 100 in which various implementations as described herein may be practiced. As shown in FIG. 1, communications system 100 includes a plurality of user devices 120A-120E (collectively referred to as user devices 120) associated with a plurality of users 130A-130E (collectively referred to as users 130) respectively. In some embodiments, communications system 100 may be a collaborative environment that allows a group of users (e.g., one or more users 130) using associated user devices (e.g., one or more user devices 120) to engage in communications, such as instant messaging (IM), chat, email, voice over IP (VoIP) phone call, audio or video conferencing, etc., and to share communication content such as data files, images, audio/video content, etc. In the present disclosure, communication may include any type of information exchange, such as messaging, chat, files sharing, and audio or video content transfer, among a group of users. In some embodiments, communications system 100 may be, for example, a communication platform based on a chat software or a social network application that allows a group of users (e.g., users 130) to exchange information and interact with one another using associated user devices (e.g., user devices 120). For example, users 130 may belong to the same community or workspace, or share a common interest or goal, and a communication group may be set up to enhance the efficiency and productivity of information transfer among the users. In the present disclosure, information exchanged among a group of users may include, for example, messages, emails, shared documents, audio/video recordings, links to Internet or web based content, or any other types of information exchanged between two or more individuals.

As shown in FIG. 1, communications system 100 may include one or more user devices 120, a network 140, a communication management server 150, and a database 170. The components and arrangements shown in FIG. 1 are not intended to limit the claims, as the system components used to implement the disclosed processes and features can vary. For example, communications system 100 may include multiple communication management servers 150, and each communication management server 150 may host a type of communication service, e.g., IM, VoIP, video conferencing, such that various types of multimedia services may be provided to user devices 120.

Network 140 facilitates communications and sharing of content between user devices 120 and communication management server 150. Network 140 may be any type of network that provides communications, exchanges information, and/or facilitates the exchange of information between communication management server 150 and user devices 120. For example, network 140 may be the Internet, a Local Area Network, a cellular network, a public switched telephone network ("PSTN"), or other suitable connection(s) that enables communications system 100 to send and receive information between the components of communications system 100. A network may support a variety of messaging formats, and may further support a variety of services and applications for user devices 120.

Communication management server 150 may be a system associated with a communication service provider which provides a variety of data or services, such as voice, messaging, or real-time audio/video to users 130. Communication management server 150 may be a computer-based system including computer system components, workstations, memory devices, and internal network(s) connecting these components. Communication management server 150 may be configured to receive information from user devices 120 over network 140, process the information, store the information, and/or transmit information to user devices 120 over network 140.

For example, communication management server 150 may be configured to establish a communication session among a group selected from users 130 through their respective user devices 120, manage information exchange among the group, control sharing of content among the group, and monitor user activities in the session. In the present disclosure, a communication group may include a plurality of users exchanging information with one another via associated user devices. Users may be included (e.g., invited or added) or excluded (e.g., by leaving the communication group or being blocked) in a communication group. A plurality of group communication sessions may be maintained by communication management server 150 simultaneously. Communication management server 150 may also be configured to maintain a list of users 130 for each group session, along with the role of each user and their access control settings, such as a moderator who is the host of the session, a creator who initiated the session, one or more users that post messages and participate in audio/video conferences among the group, and so on. In some embodiments, the functionality of communication management server 150 described in the present disclosure may be distributed among one or more of user devices 120. For example, a part or all of the communication content may be stored in one or more of user devices 120, and one or more of user devices 120 may perform functions such as initiating, maintaining, and/or closing (terminating) a session among the group.

Database 170 may include one or more physical or virtual storages coupled with communication management server 150. Database 170 is configured to store current and/or previous communications of an ongoing session, any previously completed sessions, and user activity information. Database 170 may also be adapted to store historical communication data such as video/audio messages, documents, or shared content among participants in a communication group. The data stored in database 170 may be transmitted to communication management server 150 before or during an ongoing session. In some embodiments, database 170 is stored in a cloud-based server (not shown) that is accessible by communication management server 150 and/or user devices 120 through network 140. While database 170 is illustrated as an external device connected to communication management server 150, database 170 may also reside within communication management server 150 as an internal component of communication management server 150.

As shown in FIG. 1, users 130 may be participants in a group who communicate with one another using various types of user devices 120 in an electronic communication session. As an example, user devices 120A, 120B, and 120D include a display such as a television, tablet, computer monitor, video conferencing console, or laptop computer screen. User devices 120A, 120B, and 120D may also include video/audio input devices such as a video camera, a web camera, or the like. As another example, user devices 120C and 120E may include mobile devices such as a tablet or a smartphone having display and video/audio capture capabilities. In some embodiments, communications system 100 may also include devices without display or video capture capabilities, such as a cellular phone or a telephone (not shown). User devices 120 may also include one or more software applications that enable the user devices to engage in communications, such as IM, VoIP, and video conferences, with one another in a group communication environment where each user may view content posted by other users and may post content that can be accessed by other users.

Figure 2:
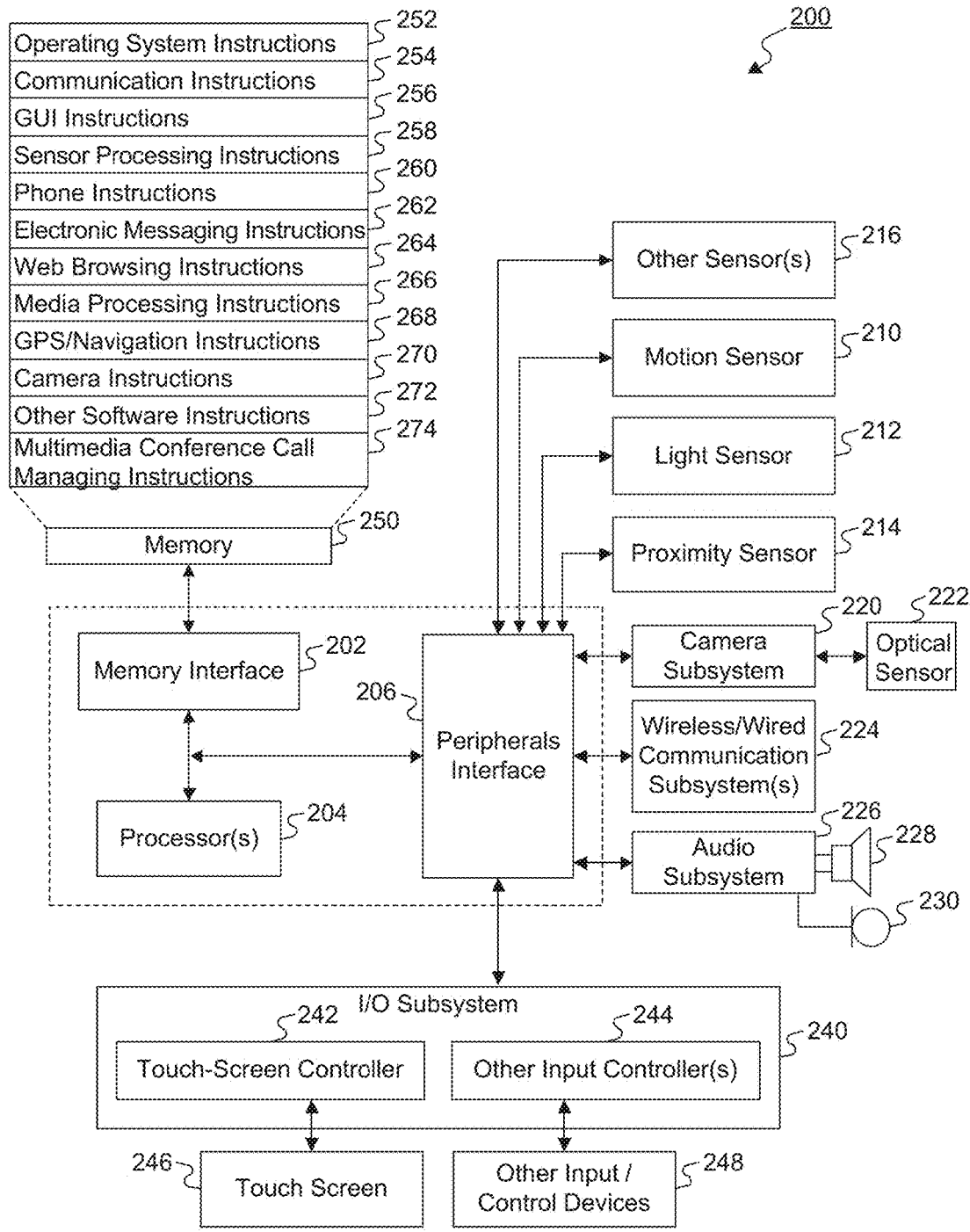
FIG. 2 is a diagram of an example user device for implementing embodiments consistent with the present disclosure.

FIG. 2 is a diagram of an example user device 200 for implementing embodiments consistent with the present disclosure. User device 200 can be used to implement computer programs, applications, methods, processes, or other software to perform embodiments described in the present disclosure. User device 200 may include a memory interface 202, one or more processors 204 such as data processors, image processors and/or central processing units, and a peripherals interface 206. Memory interface 202, one or more processors 204, and/or peripherals interface 206 can be separate components or can be integrated in one or more integrated circuits. The various components in user device 200 can be coupled by one or more communication buses or signal lines.

Sensors, devices, and subsystems can be coupled to peripherals interface 206 to facilitate multiple operations. For example, a motion sensor 210, a light sensor 212, and a proximity sensor 214 can be coupled to peripherals interface 206 to facilitate orientation, lighting, and proximity functions. Other sensors 216 can also be connected to peripherals interface 206, such as a positioning system (e.g., GPS receiver), a temperature sensor, a biometric sensor, or other sensing device, to facilitate related functionalities. A GPS receiver can be integrated with or connected to user device 200. For example, a GPS receiver can be built into mobile telephones, such as smartphone devices. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as capturing images and recording video clips.

Communication functions may be facilitated through one or more wireless/wired communication subsystems 224, which includes an Ethernet port, radio frequency receivers and transmitters and/or optical (e.g., infrared) receivers and transmitters. The specific design and implementation of wireless/wired communication subsystem 224 depends on the communication network(s) over which user device 200 is intended to operate. For example, in some embodiments, user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

I/O subsystem 240 includes a touch screen controller 242 and/or other input controller(s) 244. Touch screen controller 242 is coupled to a touch screen 246. Touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 is coupled to other input/control devices 248, such as one or more buttons, rocker switches, thumb-wheel, infrared port, USB port, and/or a pointer device such as a stylus. Touch screen 246 can, for example, also be used to implement virtual or soft buttons and/or a keyboard.

Memory interface 202 is coupled to memory 250. Memory 250 includes high-speed random access memory and/or non-volatile memory, such as one or more magnetic disk storage devices, one or more optical storage devices, and/or flash memory (e.g., NAND, NOR). Memory 250 stores an operating system 252, such as DARWIN, RTXC, LINUX, iOS, UNIX, OS X, WINDOWS, or an embedded operating system such as VXWorkS. Operating system 252 can include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions.

In some embodiments, communication instructions 254 may include software applications to facilitate connection with communication management server 150 that hosts group communications between a group of users, and graphical user interface instructions 256 may include a software program that facilitates a user associated with the user device to receive messages from communication management server 150, provide user input, and so on. Further, communication instructions 254 may include software applications allowing a user associated with user device 200 to start, suspend, or terminate displaying of the communication content in a session, and send instructions to communication management server 150. Graphical user interface instructions 256 may include a software program that enables a user associated with the user device to select a visit bookmark, review visit history in different sessions, or delete a certain visit bookmark.

Each of the above identified instructions and applications may correspond to a set of instructions for performing one or more functions described above. These instructions need not be implemented as separate software programs, procedures, or modules. Memory 250 may include additional instructions or fewer instructions. Furthermore, various functions of user device 200 may be implemented in hardware and/or in software, including in one or more signal processing and/or application specific integrated circuits.

Figure 3:
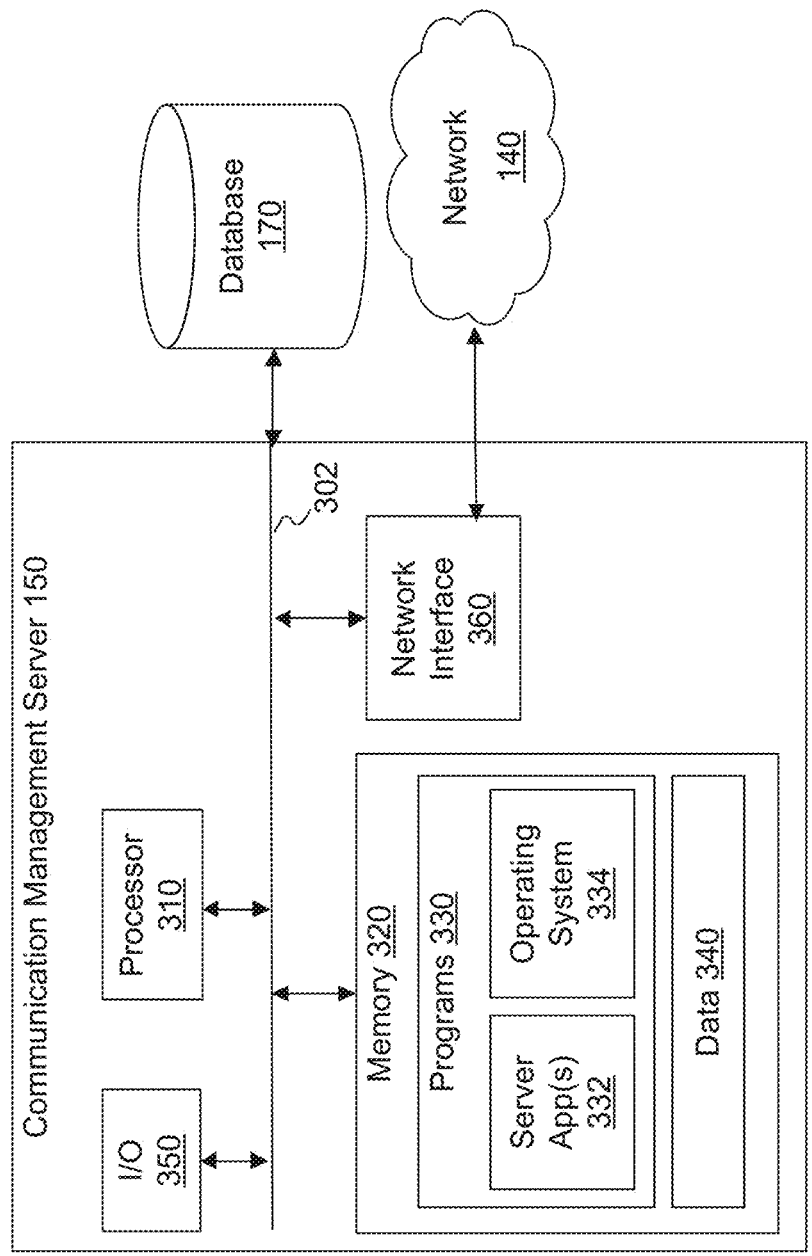
FIG. 3 is a diagram of an example communication management server, according to some embodiments of the present disclosure.

FIG. 3 is a diagram of an example communication management server 150, according to some embodiments of the disclosed embodiments. Communication management server 150 includes a bus 302 (or other communication mechanism) which interconnects subsystems and components for transferring information within communication management server 150. As shown, communication management server 150 may include one or more processors 310, input/output ("I/O") devices 350, a network interface 360 (e.g., a modem, Ethernet card, or any other interface configured to exchange data with a network, such as network 140 in FIG. 1), and one or more memories 320 storing programs 330 including, for example, server app(s) 332, operating system 334, and data 340, and can communicate with an external database 170 (which, in some embodiments, may be included within communication management server 150). Communication management server 150 may be a single server or may be configured as a distributed computer system including multiple servers, server farms, clouds, or computers that interoperate to perform one or more of the processes and functionalities associated with the disclosed embodiments.

Processor 310 may be one or more processing devices configured to perform functions of the disclosed methods, such as a microprocessor manufactured by Intel™ or manufactured by AMD™. Processor 310 may comprise a single core or multiple core processors executing parallel processes simultaneously. For example, processor 310 may be a single core processor configured with virtual processing technologies. In certain embodiments, processor 310 may use logical processors to simultaneously execute and control multiple processes. Processor 310 may implement virtual machine technologies, or other technologies to provide the ability to execute, control, run, manipulate, store, etc., multiple software processes, applications, and programs. In some embodiments, processor 310 may include a multiple-core processor arrangement (e.g., dual, quad core, etc.) configured to provide parallel processing functionalities to allow communication management server 150 to execute multiple processes simultaneously. It is appreciated that other types of processor arrangements could be implemented that provide for the capabilities disclosed herein.

Memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media may include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Communication management server 150 may include one or more storage devices configured to store information used by processor 310 (or other components) to perform certain functions related to the disclosed embodiments. For example, communication management server 150 may include memory 320 that includes instructions to enable processor 310 to execute one or more applications, such as server apps 332, operating system 334, and any other type of application or software known to be available on computer systems. Alternatively or additionally, the instructions, application programs, etc., may be stored in an external database 170 (which can also be internal to communication management server 150) or external storage devices communicatively coupled with communication management server 150 (not shown), such as one or more databases or memories accessible over network 140.

Database 170 or other external storage may be a volatile or non-volatile, magnetic, semiconductor, tape, optical, removable, non-removable, or other type of storage device or tangible or non-transitory computer-readable medium. Memory 320 and database 170 may include one or more memory devices that store data and instructions used to perform one or more features of the disclosed embodiments. Memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, communication management server 150 may be communicatively coupled to one or more remote memory devices (e.g., remote databases (not shown)) through network 140 or a different network. The remote memory devices can be configured to store information which communication management server 150 can access and/or manage. By way of example, the remote memory devices could be document management systems, Microsoft SQL database, SharePoint databases, Oracle™ databases, Sybase™ databases, or other relational databases. Systems and methods consistent with embodiments of the present disclosure, however, are not limited to separate databases or even to the use of a database.

Programs 330 include one or more software modules causing processor 310 to perform one or more functions of the disclosed embodiments. Moreover, processor 310 may execute one or more programs located remotely from one or more components of communications system 100. For example, communication management server 150 may access one or more remote programs that, when executed, perform functions related to the disclosed embodiments.

In the presently described embodiment, server app(s) 332 causes processor 310 to perform one or more functions of the disclosed methods. For example, server app(s) 332 may cause processor 310 to establish one or more group communication sessions for multiple users, and generate visit bookmarks corresponding to the users' visits to various sessions. The term session generally refers to a series of connection-based interactions between two or more communication devices where various types of information may be exchanged. Processor 310 may manage various sessions among different groups of users and track users' activities. A user may visit a session one or more times to, for example, access information shared by other users, send messages to other users or post information, add new users to the group or remove users from the group, and modify settings of the session such as access authorization of the users.

In some embodiments, other components of communications system 100 may be configured to perform one or more functions of the disclosed methods. For example, user devices 120 may be configured to request display of communication content in a session, request to suspend display of the communication content, or request to navigate back to a position indicated by a bookmark associated with a previous visit. As another example, user devices 120 may be configured to provide a user interface for a user to review and modify her visit history, delete bookmarks indicating previous visits, or modify settings regarding generation and display of bookmarks.

In some embodiments, program(s) 330 may include operating system 334 performing operating system functions when executed by one or more processors such as processor 310. By way of example, operating system 334 may include Microsoft Windows™ Unix™, Linux™, Apple™ operating systems, Personal Digital Assistant (PDA) type operating systems, such as Apple iOS, Google Android, Blackberry OS, Microsoft CE™, or other types of operating systems. Accordingly, disclosed embodiments may operate and function with computer systems running any type of operating system 334. Communication management server 150 may also include software that, when executed by a processor, provides communications with network 140 through network interface 360 and/or a direct connection to one or more user devices 120.

In some embodiments, data 340 may include profiles of users in a communication group and historical communications among the users. For example, data 340 may include instant messages sent by the users, documents and audio/video files shared by the users, and access control settings associated with the shared files.

Communication management server 150 may also include one or more I/O devices 350 having one or more interfaces for receiving signals or input from devices and providing signals or output to one or more devices that allow data to be received and/or transmitted by communication management server 150. For example, communication management server 150 may include interface components for interfacing with one or more input devices, such as one or more keyboards, mouse devices, and the like, that enable communication management server 150 to receive input from an operator or administrator (not shown).

Figure 4:
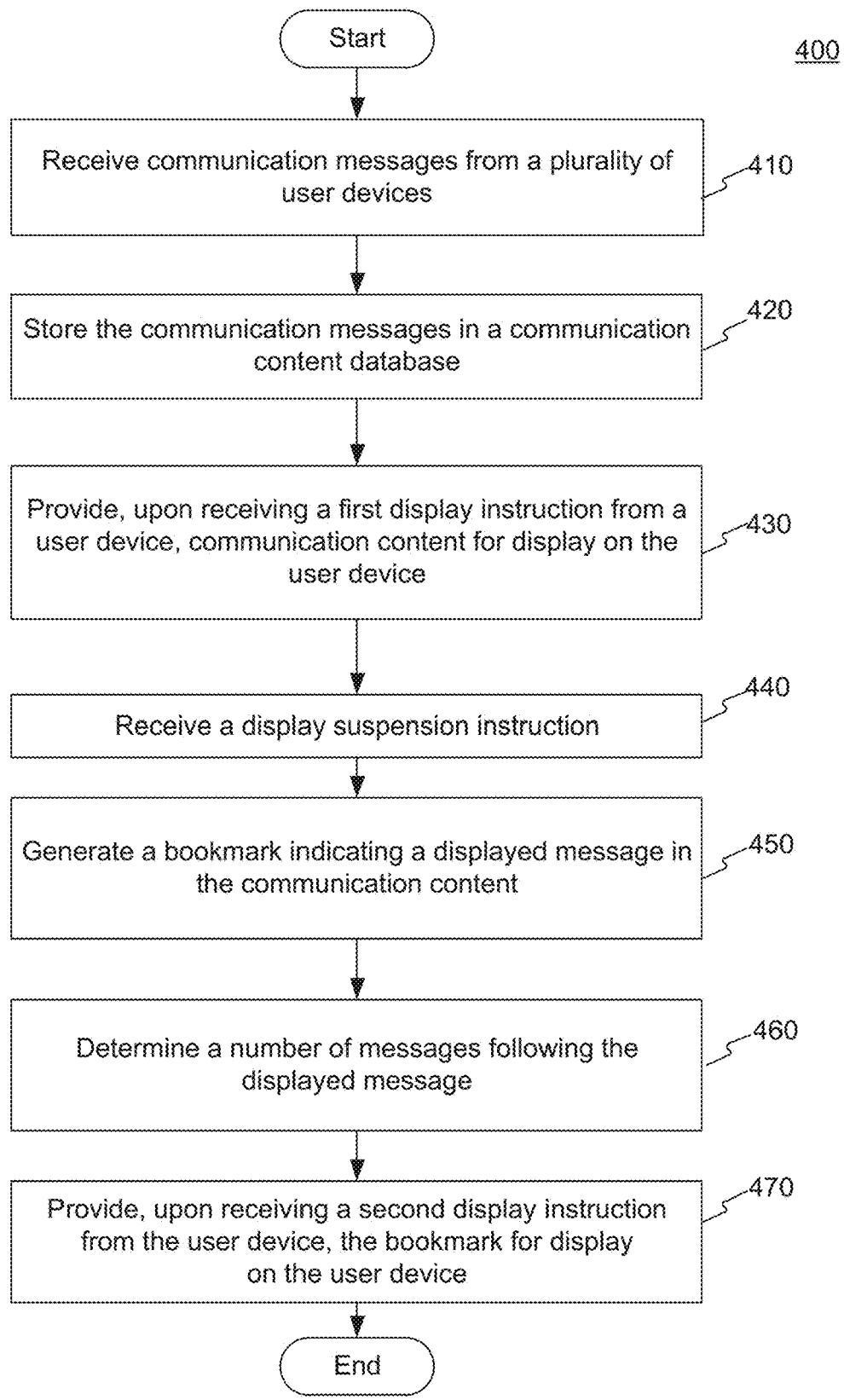
FIG. 4 is a flow chart of an example process for session visit auto-bookmarking, according to some embodiments of the present disclosure.

FIG. 4 is a flow chart of an example process 400 for session visit auto-bookmarking, according to some embodiments of the present disclosure. The steps associated with this example process may be performed by, for example, a processor of communication management server 150 as shown in FIG. 3, alone or in combination with a processor of a user device 120.

In step 410, communication management server 150 receives communication messages from a plurality of user devices, such as user devices 120 as shown in FIG. 1. Communication messages may be transmitted to communication management server 150 from the user devices through, for example, network 140. Communication messages may be in various formats, such as text messages, links to web-based content, images, videos, audios, calendar items, file folders, and documents in various formats such as Word, PDF, Excel Spreadsheet, and JPEG. Various communication transmission formats and methods known by the persons skilled in the art may be used.

In step 420, communication management server 150 may store the communication messages in a communication content database, such as database 170 as shown in FIG. 1. Communication management server 150 may store the communication messages under corresponding user accounts, or in designated files as indicated by instructions received from user devices. In some embodiments, communication management server 150 may add descriptions to the received messages, such as time markers indicating when each message was sent, and sender information associated with each message, for example, the sender's profile photo and username. Such descriptions may further be stored in the communication content database, along with the associated communication messages.

In step 430, communication management server 150 may provide, upon receiving a display instruction from a user device, communication content for display on the user device. To review communication content posted in a communication session, a user may send an instruction to communication management server 150 requesting to access communication content of that session. For example, the user may click an icon associated with the session to send a display instruction to communication management server 150.

Upon receiving a display instruction from the user device, communication management server 150 may provide communication content of the session for display, for example, on a display of the user device. The displayed communication content may include communication messages received from the user devices and descriptions of the messages, for example, time markers and sender information. In some embodiments, communication management server 150 may further provide content associated with the communication messages for display. For example, when providing a communication message indicating a location, communication management server 150 may further provide detailed information associated with the location, such as maps, directions, hours, weather, reviews, comments, and news.

In step 440, communication management server 150 may receive a display suspension instruction from the user device, for example, when display of a user interface is suspended. Display suspension may occur automatically, or it may occur when the user selects a designated button or widget displayed on a user interface associated with a session. For example, display suspension may occur when the user exits a session by clicking an exit button, or exiting/closing the software platform where the session takes place. In some embodiments, the display suspension instruction may correspond to an instruction to display a user interface associated with another session or another application. For example, the user may need to attend to matters requiring use of other applications, or the user device switches to a sleep mode or shuts down due to lack of battery power, which may also cause display suspension.

In some embodiments, notifications associated with other applications, such as an incoming phone call or video call, may interrupt the functioning of a session and cause the user device to automatically suspend display of the communication content in the session. In some other embodiments, user interfaces of multiple sessions in the same or different application may be displayed simultaneously on a display of the user device. When the user interface of a session is largely blocked by other user interfaces or if there is a lack of user operation on the user interface for a predetermined period of time, communication management server 150 may suspend providing communication content until subsequent user operations.

In one scenario, a user may be reviewing recent messages posted in a session after the user's last visit. During the process, a notification regarding a new message in another session may be received before the user finishes her review of the accumulated unread messages in the current session. A message may be considered as unread if the message has not been displayed to the user, for example, through a user interface associated with the current session. The user may intentionally or accidentally click the notification that causes display of a user interface associated with a different session where the new message is posted, thus exiting the current session. Exiting the current session in this way may cause the user device to send a display suspension instruction to communication management server 150. Details of an example scenario will be further described below with reference to FIG. 5A and FIG. 5B.

In step 450, based on the received display suspension instruction, communication management server 150 may generate a bookmark indicating one or more displayed messages. In some embodiments, the generated bookmark may indicate a position associated with one or more displayed messages. In a user interface for a chat session, for example, the bookmark may indicate the last message displayed before the user exits the user interface, the last few messages, or the last page. In some embodiments, communication management server 150 may generate a plurality of bookmarks corresponding to a plurality of user visits. The plurality of bookmarks may be stored in a database storing user visit history.

In some embodiments, a bookmark may be generated upon user operations while the user is reviewing messages in a session. For example, a user interface displaying communication content in a session may include a bookmark button, selection of which may cause communication management server 150 to generate a bookmark indicating a user-designated position or a user-designated message. Further, such a bookmark button may allow the user to choose which message(s) to be bookmarked. In some embodiments, the user interface may include multiple bookmark buttons, each associated with one of the displayed messages. The user may select a particular bookmark button, causing communication management server 150 to generate a bookmark indicating the message associated with that bookmark button. Further, the generated bookmark may be displayed along with the bookmarked position or message so that the user may easily return to the bookmarked position or message by locating the bookmark.

In some embodiments, the user interface may provide a bookmark button allowing the user to bookmark a set of messages, such as a set of messages related to the same discussion or a set of messages posted within a designated period of time. For example, selection of the bookmark button may allow the user to select a first message and a last message in the set and cause communication management server 150 to generate a bookmark indicating all messages included in the set. As another example, selection of the bookmark button may allow the user to provide input indicating a start time and an end time, and cause communication management server 150 to generate a bookmark indicating all messages sent between the start time and the end time. In some embodiments, the bookmark button may further allow the user to add or edit information associated with the generated bookmark, for example, to add a title, subject or other descriptions about the set of messages.

In some embodiments, communication management server 150 may add a time marker to the generated bookmark, indicating a time when the bookmark is generated. The time marker may include information about the year, month, day, and time, and any combination thereof. In some embodiments, upon receipt of user instructions, communication management server 150 may modify the settings regarding the generation, format, and display of the time marker. For example, upon receipt of user instructions from the user device, communication management server 150 may change the format of the time marker to include weekday or weekend information. Communication management server 150 may further store the time marker in a database storing user visit history. In some embodiments, communication management server 150 may provide the time marker for display with the associated bookmark, for example, on a user interface associated with a session or a user interface displaying user visit history, and the time marker may be displayed in a format or position defined based on user input.

In some embodiments, the bookmark may include data reflecting detailed information regarding a corresponding previous visit, such as: the duration of the previous visit, for example, a time period between the receipt of a display instruction and the occurrence of display suspension; a geographical location where the previous visit takes place, for example, as determined by a location service application installed on a user device; an indication of the device used for the previous visit, for example, a mobile phone or a tablet device associated with the user; and messages posted by the user during the previous visit.

In step 460, communication management server 150 may determine a number of messages following the displayed message indicated by the bookmark. For example, communication management server 150 may, upon generating a bookmark indicating the last displayed message during the user's previous visit, reset a count of un-displayed messages indicating a number of messages following the last displayed message. Communication management server 150 may store the determined number of un-displayed messages associated with the bookmark in a database storing user visit history.

In some embodiments, communication management server 150 may generate and store a plurality of bookmarks each corresponding to a previous visit. Communication management server 150 may determine a number of un-displayed messages associated with each bookmark and store the numbers in a database storing user visit history. Upon receipt of user instructions, communication management server 150 may provide the numbers of un-displayed messages for display on a user device, for example, on a user interface displaying user visit history. Further, the generation, format, and display of the numbers may be defined and modified based on user input.

In some embodiments, generation of bookmarks may be enabled or disabled based on user input through, for example, actions performed on an icon associated with a bookmark generation process. For example, the user interface may include an icon or button associated with a bookmark generation process in a certain position of the display or in an operations menu, wherein selection of the icon or button may cause communication management server 150 to suspend or resume generation of bookmarks.

In step 470, communication management server 150 may provide the bookmark for display on the user device, for example, through a user interface associated with a session, in response to a second display instruction from the user device. The second display instruction may correspond to a subsequent user visit to the session. For example, as further described below in the example shown in FIG. 5B and FIG. 6A, the user may return to the original session (session 1) after attending to new messages in another session.

In response to the second display instruction, communication management server 150 may provide the generated bookmark for display on the user interface. Selection of the bookmark may direct the user back to the message or position indicated by the bookmark and may cause display of communication content following the message or position. For example, for a bookmark that indicates the last displayed message during the user's previous visit, selection of the bookmark may direct the user back to the last displayed message and cause display of messages that are not displayed during the user's previous visit. In some communication platforms, upon a subsequent user visit to the session, the system default setting is to show only the most recent communication messages posted in the session. The bookmark provides a quick navigation tool directing the user to a position where the user left off during her previous visit. This way the user may effectively navigate back and continue reviewing the messages not reviewed or displayed during her last visit.

The bookmark may be displayed in different manners or positions on the user interface of the session. For example, the bookmark may be displayed in a form of an icon or a button which the user may select through an input mechanism of the user device. The bookmark may link directly to the message or position indicated by the bookmark, such as the last displayed message during the user's previous visit or a page where the last displayed message is displayed. The bookmark may be displayed, for example, on a side of the user interface or in a corner of the user interface. Various methods known by persons skilled in the art may be applied to the display format and position of the bookmark.

In some embodiments, the bookmark may be displayed together with a time marker, and/or a number of un-displayed messages corresponding to a previous visit. The bookmark may further include a portion or the entirety of the message indicated by the bookmark, for example, content of the last displayed message during the user's last visit. This way the bookmark may help the user recall where she left off in her review of messages. In some embodiments, the time marker, the number of un-displayed messages, and the content of the message indicated by the bookmark may be associated with a "hide/show" button through which the user may control display of such information.

In some embodiments, the bookmark may further include indications of options that allow the user to operate on the bookmark such as to ignore, delete, or hide the bookmark. For example, display of the bookmark may include a plurality of operation buttons, such as "ignore," "delete," "hide," and "show later." Selection of the buttons may cause communication management server 150 to operate accordingly.

In some embodiments, some of the steps described above in the example process 400 may be performed by a user device, such as one of user devices 120, as shown in FIG. 1. For example, the user device may generate a bookmark upon a display suspension instruction and add a time marker to the bookmark. As another example, the user device may further store the generated bookmark in a database storing user visit history.

Figure 5A:
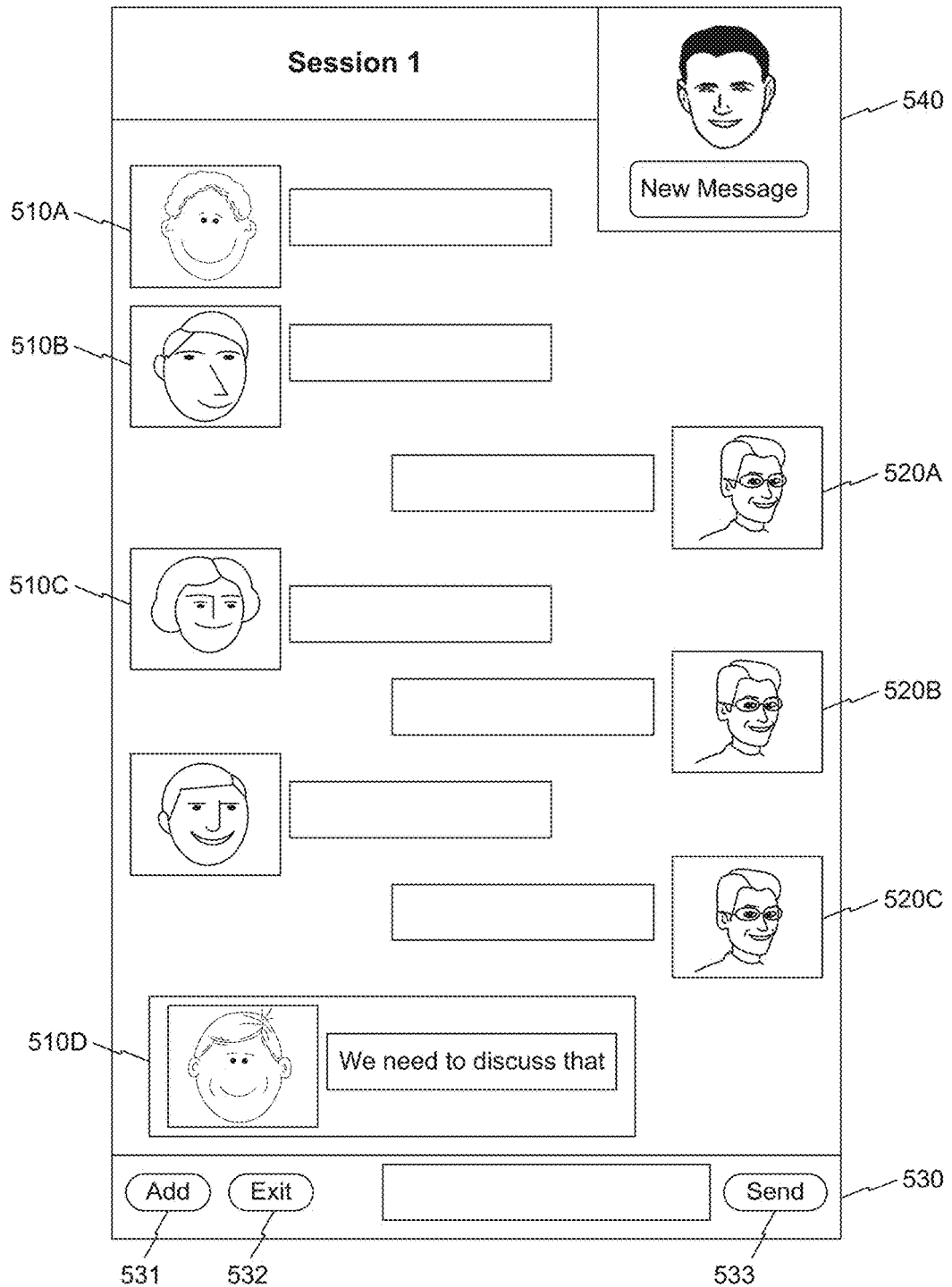
FIGS. 5A-5B illustrate example user interfaces of communication sessions for describing a method of session visit auto-bookmarking, according to some embodiments of the present disclosure.
Figure 5B:
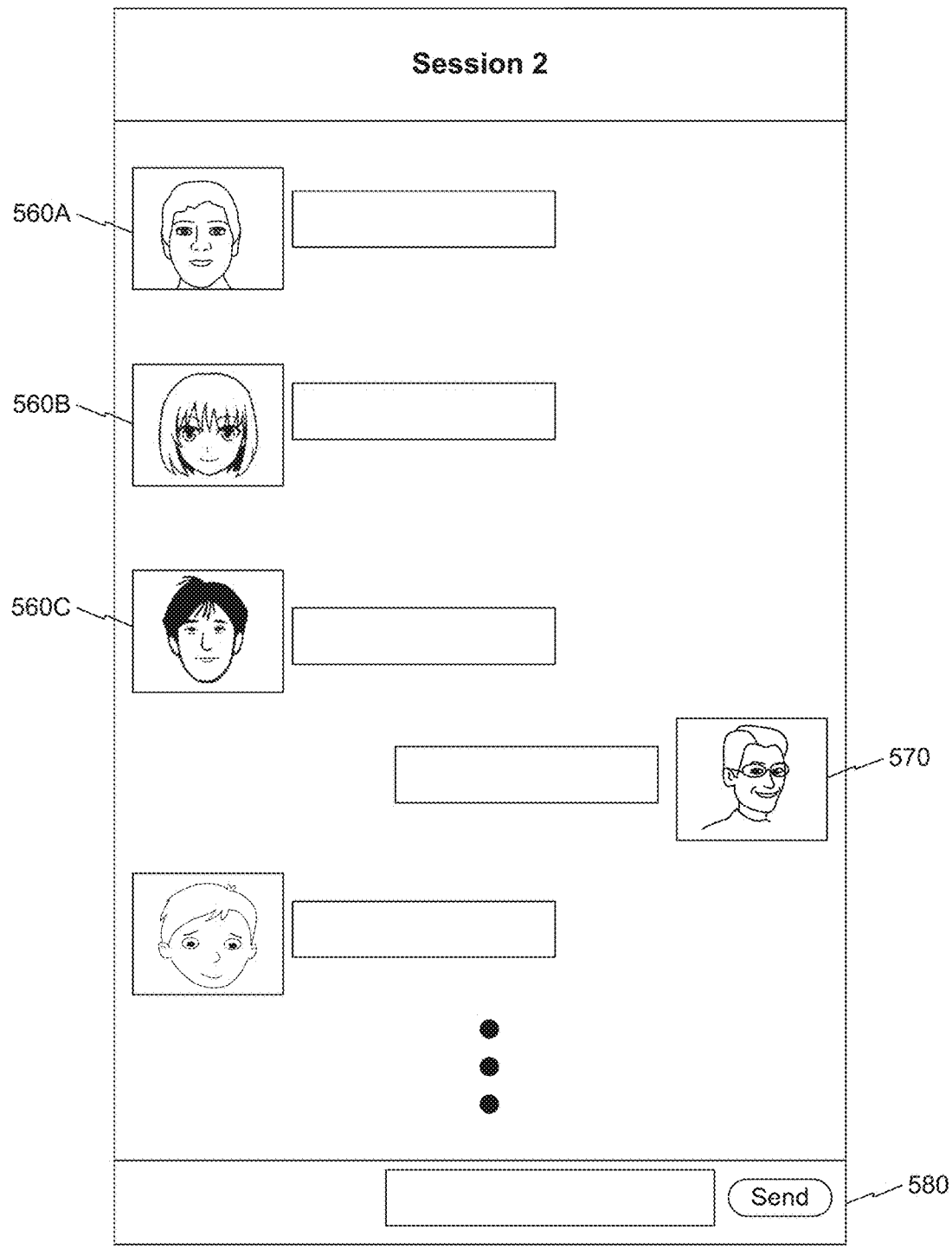

FIGS. 5A-5B illustrate example user interfaces of communication sessions, session 1 and session 2, for describing a method of session visit auto-bookmarking according to some embodiments of the present disclosure. The user interfaces may be displayed on a user device, such as one of user devices 120 as shown in FIG. 1. As shown in FIG. 5A, an example user interface for session 1 includes a plurality of communication messages 510A, 510B, 510C, 510D (collectively referred to as communication messages 510) sent from other user devices, and communication messages 520A, 520B, 520C (collectively referred to as communication messages 520) posted by the user associated with the user device. The user interface further includes an operation section 530, and a new message notification 540.

Communication messages 510 and 520 may be in various formats, as described above with reference to FIG. 4. Communication messages 510 and 520 may be displayed along with an icon representing the respective sender and a time marker indicating when each message was sent by the sender. Operation section 530 may further include a plurality of operation buttons, such as: an add button 531, which may allow the user to add a new user to the group or add an image or a file to a to-be-sent communication message; an exit button 532, which may allow the user to exit the session; and a send button 533 which may allow the user to send/post a new communication message to the group. Operation section 530 may include other operation buttons, icons, or functions, or any combination thereof, which is not limited by the disclosed embodiments of present disclosure.

In this example, when the user is reviewing the currently displayed messages in session 1, the user may receive new message notification 540 indicating, for example, a new message from Jane Doe posted in session 2. In some embodiments, the notification may be a notification regarding new activities in another application, such as an email, a calendar item, a phone call, or a video call. Upon seeing the notification, the user may decide to switch to session 2 to review the new message. For example, the new message may indicate an urgent email from a superior requiring immediate attention from the user, and the user may need to attend to it before she finishes reviewing all the messages in session 1, such as those not yet displayed on the user interface. The user may then switch to session 2, leaving session 1.

Session 2 may be a session on the same communication platform as session 1, or on a different communication platform. For example, session 1 may be a group chat session on Facebook and session 2 may be a group conference call on Skype. In the example shown in FIG. 5B, the user interface for session 2 includes a plurality of communication messages 560A, 560B, and 560C received from other users in session 2, a communication message 570 sent by the user, and an operation section 580.

Upon switching to session 2, display of communication content in session 1 may be suspended as the user interface for session 2 is now displayed. In some embodiments, display suspension may be caused by selection of exit button 532 by the user or a lack of user operation in session 1 for a predetermined period of time. Corresponding to the display suspension of communication content in session 1, communication management server 150 or the user device may generate a bookmark indicating a position or a message in the displayed communication content, for example, the last displayed message 510D. As described above with reference to FIG. 4, a time marker and/or a number of un-displayed messages following 510D may be added corresponding to the generated bookmark.

Figure 6A:
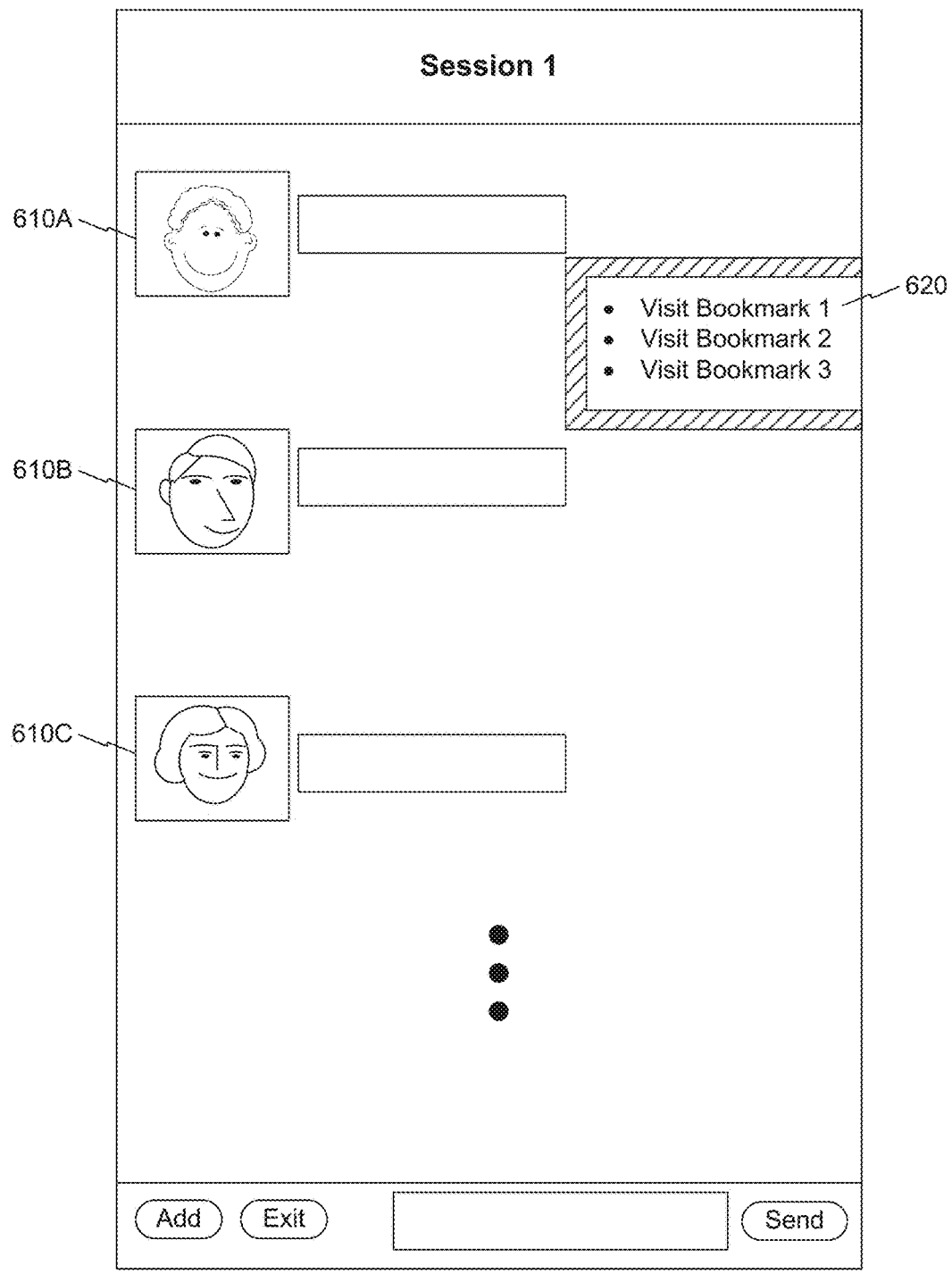
FIGS. 6A-6B illustrate example user interfaces of a communication session with visit bookmarks, according to some embodiments of the present disclosure.

FIG. 6A is an example user interface of session 1 (from FIG. 5A) displayed on the user device upon the user's return to session 1. For example, after reviewing messages in session 2 or attending to matters associated with other applications, the user may return to session 1 to continue reviewing messages in session 1. The example user interface as shown in FIG. 6A includes communication messages 610A, 610B, and 610C (collectively referred to as communication messages 610) received from other users, and a bookmark section 620, which may include one or more bookmarks. In some embodiments, bookmark section 620 may include a pre-set number of bookmarks corresponding to the user's settings. The display position and format of bookmark section 620 and the number of the bookmarks included therein may vary and may be changed based on user input.

In some embodiments, one or more of the displayed bookmark may include details associated with the bookmark, such as a time marker, a number of un-displayed messages, the entirety or a portion of the message indicated by the bookmark such as the last displayed message before the user exits the session, the duration and location of the corresponding previous visit, the device used, and the messages posted by the user during the previous visit. Bookmark section 620 may further include a plurality of operation buttons, such as "ignore," "hide," and "show later," selection of which may cause the corresponding operations to be performed.

Figure 6B:
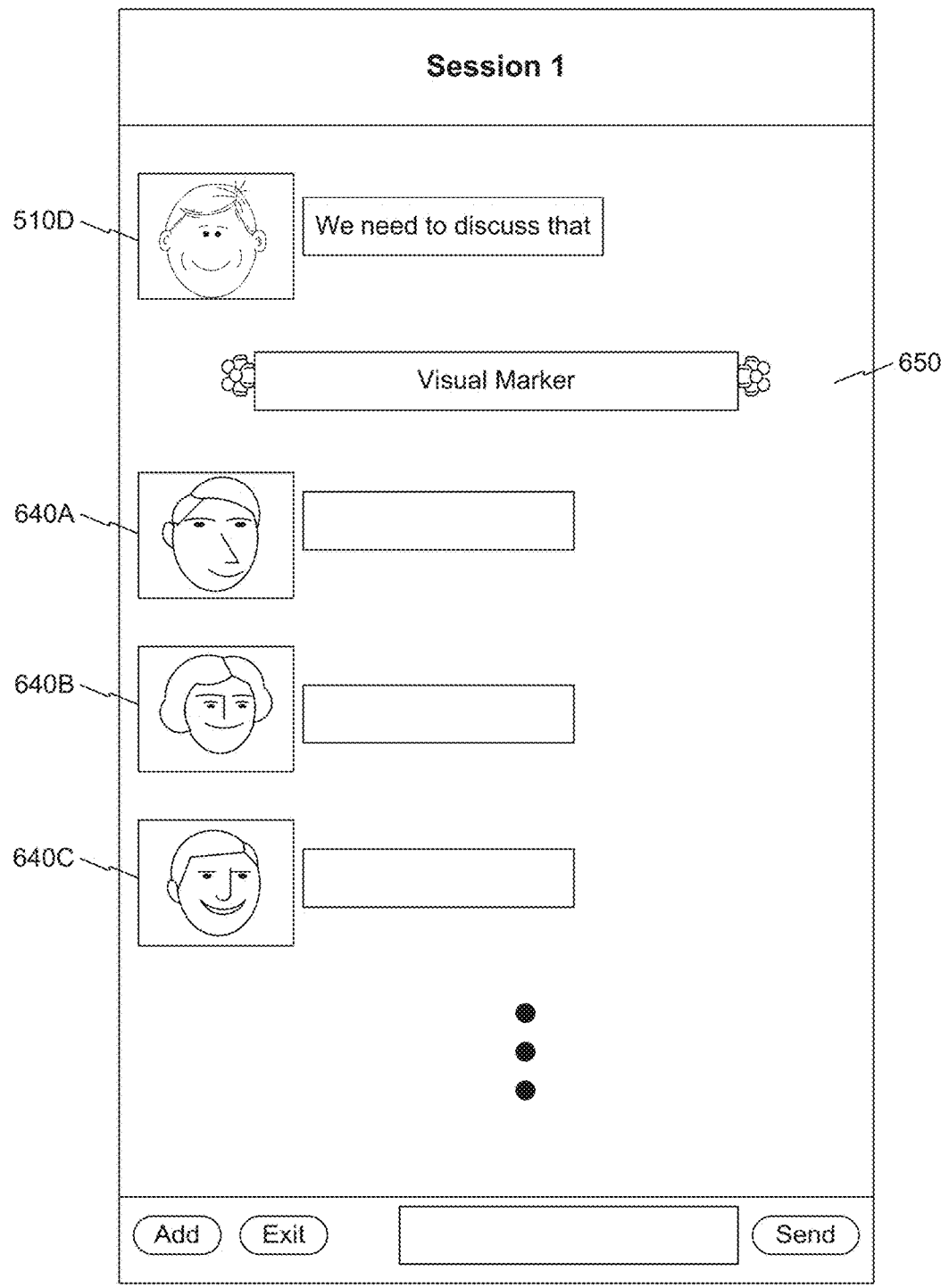

Assuming bookmark 1 in bookmark section 620, as shown in FIG. 6A, corresponds to the user's previous visit as shown in FIG. 5A, selection of bookmark 1 may navigate back to the position or message indicated by the bookmark, which in this example is the last displayed message 510D during the user's previous visit. As shown in FIG. 6B, the last displayed message 510D from John Doe, stating "We need to discuss that," is displayed, along with communication content following the message.

In this example, the user interface further includes a visual marker 650 corresponding to bookmark 1 and distinguishing the last displayed message 510D from the communication content following 510D that was not displayed during the user's previous visit, including communication messages 640A, 640B, and 640C. Visual marker 650 may be displayed in various formats, and may be displayed in different positions of the user interface.

Further, communication content following the last displayed message 510D may be displayed in a visually different format than that of the last displayed message 510D and the communication content prior to the last displayed message 510D, so that the user may effectively locate where she left off during her last visit. This may occur automatically or upon receipt of user instructions. In some embodiments, the user may click an operation button associated with the display format of the communication content, to send an instruction to communication management server 150 to provide the communication content following the last displayed message 510D for display in a different format. For example, based on user input, the communication content following the last displayed message 510D may be displayed in a different color, font, size, or background from the content prior to 510D.

Figure 7:
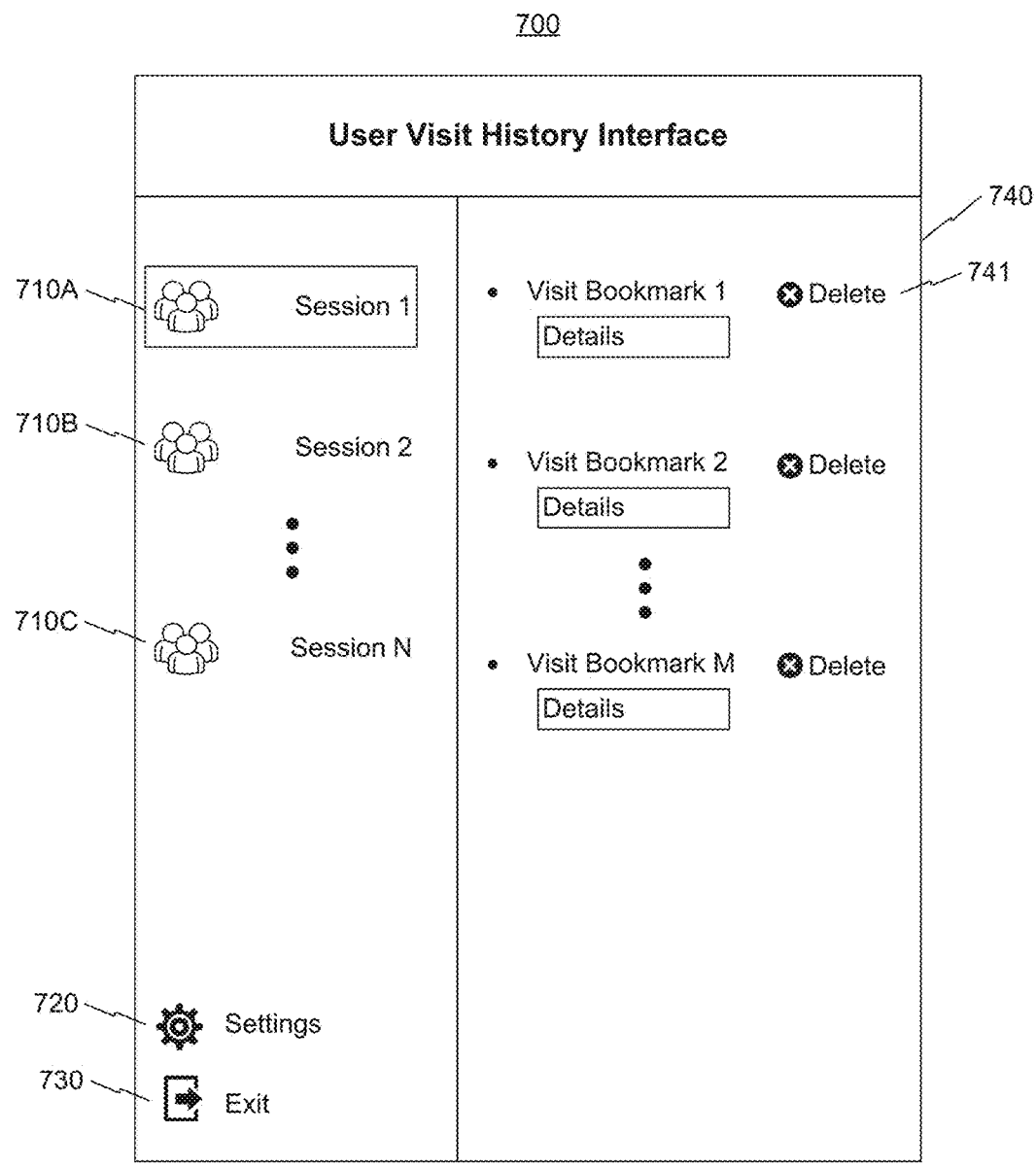
FIG. 7 illustrates an example user interface showing user visit history, according to some embodiments of the present disclosure.

FIG. 7 illustrates an example user interface showing user visit history, according to some embodiments of the present disclosure. Example user interface 700 in this example includes session icons 710A, 710B, and 710C (collectively referred to as session icons 710) associated with a plurality of sessions, a settings button 720, an exit button 730, and a bookmark display section 740. User interface 700 may be displayed, for example, on one of user devices 120 as show in FIG. 1. User interface 700 serves only as an example, as the components and layouts of the user interface may vary and may be modified based on user input.

In user interface 700, session icons 710 may correspond to a preset number of sessions, selection of which may cause display of user visit history in the corresponding session. Settings button 720 may allow the user to modify the settings regarding user interface 700, such as the components of the user interface, positions and sizes of different components, the number and combination of the session icons displayed, and the number of bookmarks displayed with respect to a particular session. In some embodiments, settings button 720 may further include indications of options that allow the user to disable or resume generation of bookmarks. Exit button 730 may allow the user to exit user interface 700.

Corresponding to the selected session icon 710A, bookmark display section 740 shows a number of bookmarks in session 1, each associated with a previous visit of the user to session 1. The bookmarks may be displayed in different formats, and may include details associated with a corresponding user visit. For example, bookmark 1 may further include a time marker, a number of un-displayed messages, or content of the message indicated by the bookmark.

Bookmark 1 further includes a delete button 741, selection of which may cause deletion of bookmark 1. In some embodiments, user interface 700 may include option buttons associated with deleting all bookmarks in a certain session or deleting all bookmarks in all sessions to erase user visit history. Further, user interface 700 may include option buttons allowing the user to delete all bookmarks generated within a certain period of time or prior to a certain time point.

Consistent with the present disclosure, and to overcome at least some of the shortcomings noted in prior art systems, a user uses a user interface to access communication content, for example, a set of messages sent by users of a chat session. The user may use a user device to send an instruction to a server managing the chat session, requesting the server to provide communication content for display through the user interface. The user may subsequently exit the user interface. The user interface may maintain information in the form of a "bookmark" identifying a location within the communication content. In the case of a chat session this location could be the last message in the set that the user interface displayed to the user before the user exited the user interface. Upon receipt by the server of another instruction from the user device to access the communication content, the server may provide the communication content along with the bookmark. By selecting the bookmark the user causes the user interface to go directly to the corresponding location within the communication content.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A communication management server for visit auto-bookmarking, the communication management server comprising:
a memory storing a set of instructions; and
at least one processor configured to execute the instructions to:
receive, from a plurality of user devices, communication messages associated with a group communication session;
store the communication messages in a communication content database;
provide, upon receiving a first display instruction from a user device, communication messages for display on the user device from the communication content database;
generate a visit bookmark indicating at least one of currently displayed communication messages when a current display is suspended; and
provide, upon receiving user selection of the visit bookmark, communication messages following the bookmarked message for display on the user device.

2. The communication management server according to claim 1, wherein the at least one processor is further configured to:
determine a number of communication messages following the bookmarked message.

3. The communication management server according to claim 1, wherein the at least one processor is further configured to:
visually distinguish the communication messages provided for display following the bookmarked message from communication messages displayed prior to the bookmarked message.

4. The communication management server according to claim 1, wherein the at least one processor is further configured to:
add a time marker to the visit bookmark, the time marker indicating a time when the visit bookmark is generated.

5. The communication management server according to claim 1, wherein the at least one processor is further configured to:
provide the visit bookmark with the time marker for display on a user interface indicating user visit history.

6. The communication management server according to claim 5, wherein the at least one processor is further configured to:
receive a visit bookmark delete instruction from the user device; and
delete the visit bookmark from the user visit history.

7. The communication management server according to claim 1, wherein the at least one processor is further configured to:
generate a plurality of visit bookmarks corresponding to a plurality of display suspension operations; and
provide a predetermined number of visit bookmarks for display on the user device.

8. The communication management server according to claim 1, wherein the at least one processor is further configured to:
edit information associated with the generated visit bookmark based on user input.

9. The communication management server according to claim 1, wherein the at least one processor is further configured to:
receive a visit bookmark disable instruction from the user device; and
suspend generation of visit bookmarks.

10. A communication management method for visit auto-bookmarking, the method comprising:
receiving, from a plurality of user devices, communication messages associated with a group communication session;
storing the communication messages in a communication content database;
providing, upon receiving a first display instruction from a user device, communication messages for display on the user device from the communication content database;

generating a visit bookmark indicating at least one of currently displayed communication messages when a current display is suspended; and providing, upon receiving user selection of the visit bookmark, communication messages following the bookmarked message for display on the user device.

11. The communication management method of claim 10, further comprising:

determining a number of communication messages following the bookmarked message.

12. The communication management method of claim 10, further comprising:

visually distinguishing the communication messages provided for display following the bookmarked message from communication messages displayed prior to the bookmarked message.

13. The communication management method of claim 10, further comprising:

adding a time marker to the visit bookmark, the time marker indicating a time when the visit bookmark is generated.

14. The communication management method of claim 10, further comprising:

providing the visit bookmark with the time marker for display on a user interface indicating user visit history.

15. The communication management method of claim 14, further comprising:

receiving a visit bookmark delete instruction from the user device; and deleting the visit bookmark from the user visit history.

16. The communication management method of claim 10, further comprising:

generating a plurality of visit bookmarks corresponding to a plurality of display suspension operations; and providing a predetermined number of visit bookmarks for display on the user device.

17. The communication management method of claim 10, further comprising:

editing information associated with the generated visit bookmark based on user input.

18. A non-transitory computer readable medium that stores a set of instructions, which are executable by at least one processor of a communication management apparatus to perform a communication management method for visit auto-bookmarking, the method comprising:

receiving, from a plurality of user devices, communication messages associated with a group communication session;

storing the communication messages in a communication content database;

providing, upon receiving a first display instruction from a user device, communication messages for display on the user device from the communication content database;

generating a visit bookmark indicating at least one of currently displayed communication messages when a current display is suspended; and providing, upon receiving user selection of the visit bookmark, communication messages following the bookmarked message for display on the user device.

19. The communication management server according to claim 1, wherein the at least one of currently displayed communication messages is selected based on user input.

20. The communication management server according to claim 1, wherein the at least one processor is further configured to:

provide, for display on the user device, the visit bookmark and at least a portion of the bookmarked message.

* * * * *